(12) United States Patent
Asai

(10) Patent No.: US 8,797,768 B2
(45) Date of Patent: Aug. 5, 2014

(54) POWER CONVERSION DEVICE INCLUDING SHORT CIRCUIT DETECTION DEVICE

(75) Inventor: Takamasa Asai, Chiyoda-ku (JP)

(73) Assignee: Mitsubishi Electric Corporation, Tokyo (JP)

( * ) Notice: Subject to any disclaimer, the term of this patent is extended or adjusted under 35 U.S.C. 154(b) by 176 days.

(21) Appl. No.: 12/431,182

(22) Filed: Apr. 28, 2009

(65) Prior Publication Data

US 2010/0142235 A1 Jun. 10, 2010

(30) Foreign Application Priority Data

Dec. 10, 2008 (JP) ................................. 2008-314276

(51) Int. Cl.
*H02H 7/122* (2006.01)

(52) U.S. Cl.
USPC ............. 363/56.04; 363/89; 363/98; 363/132

(58) Field of Classification Search
USPC ............... 363/56.01, 56.02, 56, 95, 131, 132, 363/56.1, 53, 56.03, 56.05, 89, 97, 98, 127, 363/56.04
See application file for complete search history.

(56) References Cited

U.S. PATENT DOCUMENTS

| | | | |
|---|---|---|---|
| 6,577,097 B2 * | 6/2003 | Krefta et al. | 318/801 |
| 7,081,738 B2 * | 7/2006 | Muramatsu et al. | 322/24 |
| 7,135,835 B2 * | 11/2006 | Yamada et al. | 318/800 |
| 7,609,022 B2 * | 10/2009 | Oyobe et al. | 318/800 |
| 2003/0081440 A1 * | 5/2003 | Komatsu et al. | 363/132 |
| 2009/0067205 A1 * | 3/2009 | Oyobe et al. | 363/98 |

FOREIGN PATENT DOCUMENTS

| | | | |
|---|---|---|---|
| JP | S57-40325 | * | 3/1982 |
| JP | S57-40325 A | | 5/1982 |
| JP | 11-067483 A | | 3/1999 |
| JP | 2001-238484 A | | 8/2001 |
| JP | 2001-275392 A | | 10/2001 |
| WO | WO 2007/122701 A1 | | 11/2007 |

OTHER PUBLICATIONS

Japanese Search Report No. 2008-314276, dated Oct. 19, 2010.

* cited by examiner

*Primary Examiner* — Jue Zhang
*Assistant Examiner* — Lakaisha Jackson
(74) *Attorney, Agent, or Firm* — Sughrue Mion, PLLC

(57) ABSTRACT

Provided is a power conversion device capable of detecting a short circuit failure and protecting from the same securely. The power conversion device includes: a three-phase bridge type power conversion circuit including a semiconductor switch including a first main terminal, a second main terminal, and a control terminal; a control circuit for controlling an operation of the semiconductor switch; and a voltage detection circuit for monitoring a voltage between DC terminals of the power conversion circuit, in which the control circuit has a protection function of turning off the semiconductor switch if the voltage between the DC terminals of the power conversion circuit, which is detected by the voltage detection circuit, is lower than a predetermined value for a predetermined period of time or longer.

5 Claims, 4 Drawing Sheets

POWER CONVERSION DEVICE INCLUDING SHORT CIRCUIT DETECTION DEVICE

BACKGROUND OF THE INVENTION

1. Field of the Invention

The present invention relates to a three-phase bridge type power conversion device for converting a DC power from a battery or the like into a three-phase AC power so as to drive a rotating electric machine, or converting a three-phase AC power generated by a rotating electric machine into a DC power so as to supply the converted DC power to a DC power supply such as a battery. In particular, the present invention relates to a power conversion device including detection and protection means for a short circuit failure between terminals (i.e., an arm short circuit due to a short circuit breakdown or an improper turning on of a semiconductor switch, and a short circuit to power supply, a short circuit to ground or a short circuit between phases due to a mechanical contact, and the like).

2. Description of the Related Art

A conventional power conversion device usually includes a certain type of current detecting means for detecting excessive current caused by a short circuit failure (see, for example, Japanese Patent Application Laid-open No. 2001-275392). The excessive current detecting means described in Japanese Patent Application Laid-open No. 2001-275392 includes a three-phase bridge type power conversion circuit made up of a semiconductor switch and a low resistance resistor (shunt resistor) for detecting current that is inserted in a DC line on a low potential side of the power conversion circuit. Further, if a voltage drop across the resistor exceeds a predetermined value, it is decided that excessive current is flowing therethrough. Then, the semiconductor switch is turned off so as to protect the circuit against a short circuit failure.

However, the conventional technology has problems as follows.

Such a conventional power conversion device causes a power loss by the shunt resistor even in a normal state where a short circuit failure occurs. Therefore, an efficiency of the power conversion device is decreased. In addition, it is necessary to take heat release measures for preventing overheating due to the power loss. As a result, the power conversion device may have to be a large size, and a cost thereof may be increased. In addition, it is necessary to shut off a large current by the semiconductor switch after detecting the short circuit current flowing due to the short circuit failure. Therefore, a secondary breakdown of the semiconductor switch may occur deviating from a safe operation range thereof when the large current is shut off.

SUMMARY OF THE INVENTION

The present invention has been made in order to solve the problems described above, and it is an object of the present invention to provide a power conversion device with a small size and low cost, which is capable of detecting a short circuit failure and protecting from the same securely.

A power conversion device according to the present invention includes: a three-phase bridge type power conversion circuit including a semiconductor switch including a first main terminal, a second main terminal, and a control terminal; a control circuit for controlling an operation of the semiconductor switch; and a voltage detection circuit for monitoring a voltage between DC terminals of the power conversion circuit, in which the control circuit has a protection function of turning off the semiconductor switch if the voltage between the DC terminals of the power conversion circuit, which is detected by the voltage detection circuit, is lower than a predetermined value for a predetermined period of time or longer.

According to the power conversion device of the present invention, a threshold value of the voltage between the DC terminals of the power conversion circuit is set to be a voltage lower than a minimum voltage of the voltage between the DC terminals that the power conversion circuit can reach in a normal operation. The short circuit failure can be detected if a state where the voltage between the DC terminals of the power conversion circuit is lower than the threshold value continues for a predetermined period of time or longer. Thus, it is possible to obtain the power conversion device with a small size and low cost that is capable of detecting the short circuit failure and protecting from the same securely.

DETAILED DESCRIPTION OF THE PREFERRED EMBODIMENTS

Hereinafter, preferred embodiments of the power conversion device according to the present invention are described with reference to the attached drawings.

Embodiment 1

Figure 1:
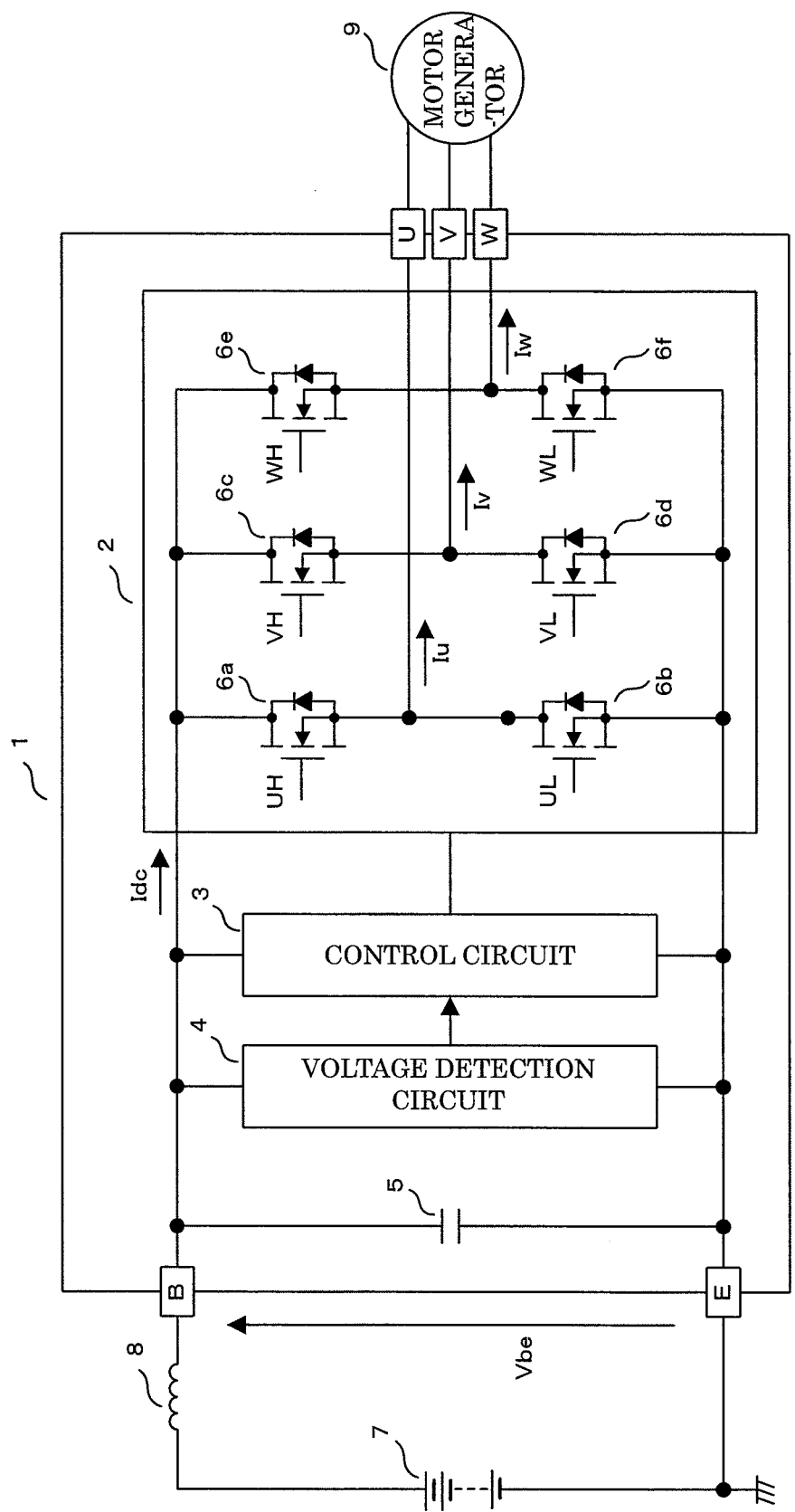
FIG. 1 is an overall structural diagram of a drive electric power generating system using a three-phase motor generator according to Embodiment 1 of the present invention.

FIG. 1 is an overall structural diagram of a drive electric power generating system using a three-phase motor generator according to Embodiment 1 of the present invention. The drive electric power generating system illustrated in FIG. 1 includes a power conversion device 1, a battery 7 connected thereto externally, wire inductance 8, and a motor generator 9 corresponding to the three-phase motor generator.

Here, the power conversion device 1 includes a power conversion circuit 2, a control circuit 3, a voltage detection circuit 4, and a capacitor 5. In addition, the power conversion circuit 2 is a so-called three-phase bridge type power conversion circuit having a 2-series and 3-parallel structure including N-channel type power MOSFETs 6a to 6f as semiconductor switches.

Next, operations of the drive electric power generating system having the structure illustrated in FIG. 1 are described. A DC power of the battery 7 is converted by the power conversion device 1 into a three-phase AC power so that the motor generator 9 is driven for exerting a rotation force on an engine (not shown). On the other hand, the motor generator 9 driven by rotation of the engine (not shown) generates the three-phase AC power, which is converted into a DC power by the power conversion device 1 and is supplied to the battery 7 and a load of a vehicle (not shown).

A high potential side DC terminal B and a low potential side DC terminal E of the power conversion device 1 are respectively connected to a positive terminal and a negative terminal of the battery 7. In addition, three-phase AC terminals U, V, and W of the power conversion device 1 are respectively connected to stator windings of U phase, V phase, and W phase of the motor generator 9. Note that the wire inductance 8 represents a total sum of parasitic inductances of the wires on the high potential side and the low potential side for connecting the battery 7 to the power conversion device 1.

The power conversion device 1 has the so-called three-phase bridge type power conversion circuit 2 having the 2-series and 3-parallel structure including the N-channel type power MOSFETs 6a to 6f as semiconductor switches inside the same. Further, as to this power conversion circuit 2, both ends and middle points of the 2-series are respectively connected to the DC side terminals B and E, and the AC side terminals U, V, and W of the power conversion device 1.

Each of the power MOSFETs 6a to 6f includes a first main terminal (drain), a second main terminal (source), and a control terminal (gate), and is controlled to be turned on and off by a voltage between the gate and the source. Further, each of the power MOSFETs 6a to 6f becomes a resistor element that makes a bidirectional electric path between the drain and the source when it is turned on while it becomes a diode element that makes an electric path only in the direction from the source to the drain when it is turned off.

In addition, the capacitor 5 having a small capacitance is connected between the DC side terminals B and E of the power conversion device 1. Further, this capacitor 5 has a role of reducing high frequency noise due to switching of the power MOSFETs 6a to 6f, or the like, and suppressing radiation noise such as radio noise. When the power conversion device 1 performs a power conversion by pulse width modulation (PWM) control, a capacitor having a large capacitance is usually connected at the position of the capacitor 5 in order that a voltage between the DC side terminals B and E is smoothed. However, in the present invention, the smoothing capacitor having a large capacitance is not always necessary, because the power conversion is performed by a single pulse turn on method (Embodiment 1 and Embodiment 2), or a synchronous rectification control method (Embodiment 3) that are described later.

In addition, the voltage detection circuit 4 is connected between the DC side terminals B and E of the power conversion device 1. Further, when the power conversion device 1 controls electric generation of the motor generator 9, the voltage detection circuit 4 delivers a voltage detection value between the DC side terminals B and E that is necessary as feedback information to the control circuit 3. In addition, when the voltage between the DC side terminals B and E becomes lower than a predetermined value for a given period of time or longer, the voltage detection circuit 4 delivers a fail signal to the control circuit 3.

The control circuit 3 performs ON and OFF drive control of the power MOSFETs 6a to 6f of the power conversion circuit 2 in accordance with the operation mode based on an instruction from a higher level ECU (not shown) and various sensor information (not shown). In addition, the control circuit 3 also performs current control of a field winding of a rotor (not shown) of the motor generator 9. Further, the control circuit 3 has a function of turning off the power MOSFETs 6a to 6f of the power conversion circuit 2 forcedly upon receiving the fail signal from the voltage detection circuit 4.

Note that the case is described here, where the voltage detection circuit 4 decides whether or not the voltage between the DC side terminals B and E becomes lower than the predetermined value for the given period of time or longer. However, it is possible to adopt another structure where the control circuit 3 decides whether or not the voltage between the DC side terminals B and E becomes lower than the predetermined value for the given period of time or longer, based on a voltage value detected by the voltage detection circuit 4.

Figure 2:
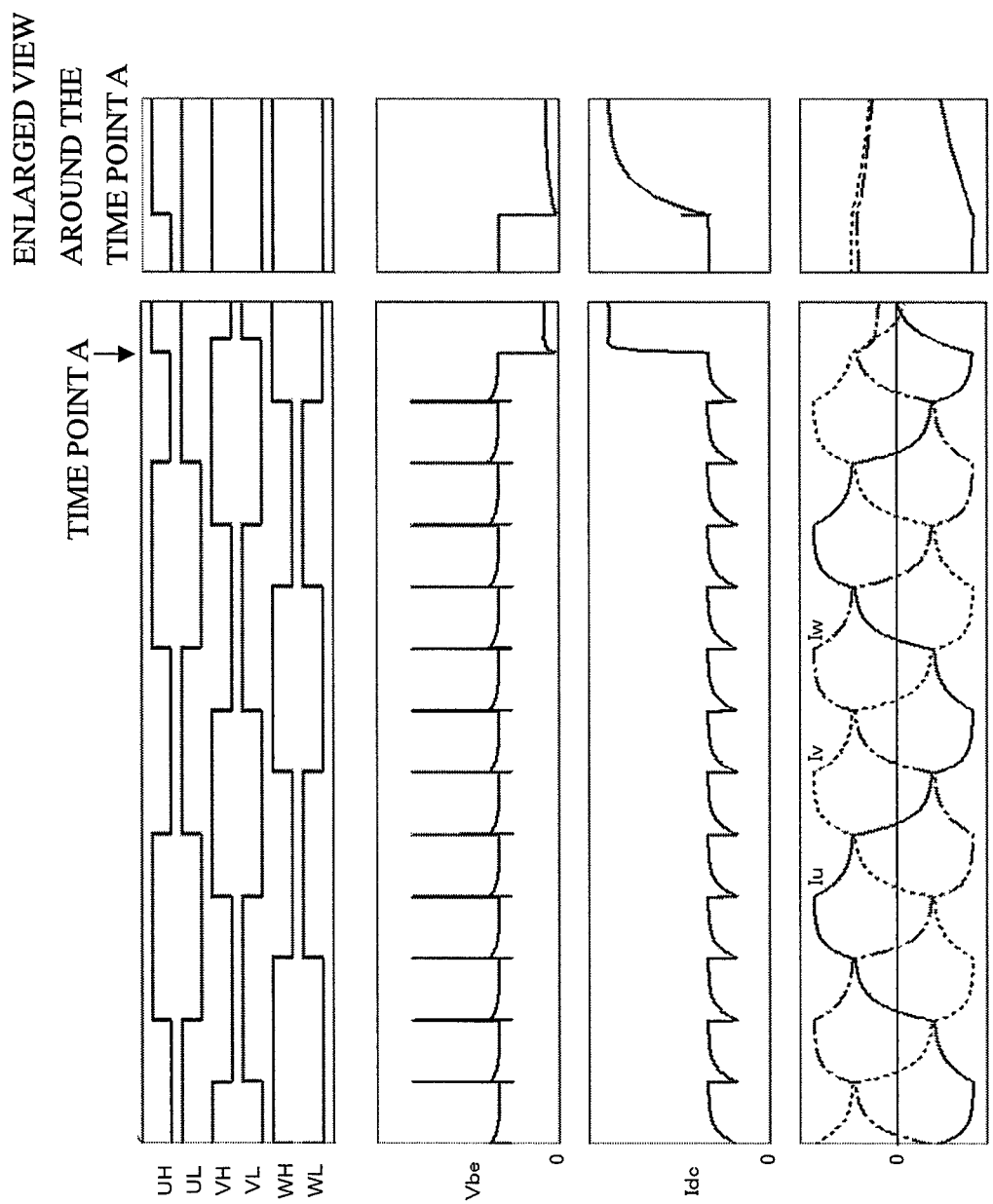
FIG. 2 is an explanatory diagram of operational waveforms of individual portions in 180 degree energizing control according to Embodiment 1 of the present invention.

Next, in the structure of FIG. 1, operational waveforms of individual portions are described, in which the single pulse turn on control with a conducting angle of 180 degrees is applied for driving the motor generator 9, including the case where a short circuit failure occurs. FIG. 2 is an explanatory diagram of the operational waveforms of the individual portions in 180 degree energizing control according to Embodiment 1 of the present invention.

Each of UH, UL, VH, VL, WH, and WL denotes ON and OFF logic of each of the power MOSFETs 6a to 6f controlled by the control circuit 3, and "high" indicates an ON state while "low" indicates an OFF state. Note that a period of time (dead time) is secured between ON and OFF switching timings of the power MOSFETs in the same phase (i.e., 6a and 6b, 6c and 6d, or 6e and 6f) so as to prevent a common phase arm short circuit due to simultaneous turning on.

Next, Vbe denotes the voltage between the DC side terminals B and E of the power conversion device 1. In addition, Idc denotes the current flowing in a DC line on the high potential side of the power conversion circuit 2. Further, Iu, Iv, and Iw currents that respectively flow in the AC terminals U, V, and W of the power conversion device 1 (the direction from the power conversion device 1 to the motor generator 9 is a positive direction).

In this way, the 180 degree energizing control changes the pattern of turning on the power MOSFETs every 60 degrees of the phase in synchronization with the rotation of the motor generator 9 in such an order as "(UH, VL, WH)→(UH, VL, WL)→(UH, VH, WL)→(UL, VH, WL)→(UL, VH, WH)→ (UL, VL, WH)→(UH, VL, WH)". Thus, AC voltages are applied between terminals of the stator windings of the motor generator 9 so that three-phase AC currents Iu, Iv, and Iw flow in the stator windings.

In other words, one of the power MOSFETs on the high potential side and the low potential side having two turned-on phases is always turned off so that substantially a half of DC current Idc supplied from the battery 7 is shut off. Therefore, a counter electromotive surge generated in the wire inductance 8 causes a voltage rise in the waveform of Vbe every 60 degrees of the phase. After that, the waveform of Vbe converges with oscillation by a resonance frequency of the wire inductance 8 and the capacitor 5. Therefore, the minimum value of Vbe is lower than the voltage in a steady state by an undershoot voltage of the oscillation.

On the other hand, when each of the power MOSFETs 6a to 6f is turned on, it is turned on at the phase where the current flows in the direction from the source to the drain, i.e., the phase where the current flows in the parasitic diode of the power MOSFET. Therefore, the waveform of Vbe exhibits no conspicuous change. In this way, the switching of each of the power MOSFETs 6a to 6f does not cause a substantial drop of Vbe in the drive mode by the 180 degree energizing control even if the capacitor 5 has a small capacitance.

Next, it is supposed that the power MOSFET 6a of UH is improperly turned on so that the power MOSFETs 6a and 6b of the U phase are turned on simultaneously resulting in occurrence of a short circuit between the DC side terminals B and E of the power conversion device 1 at a time point A (see FIG. 2) in the drive operation of the motor generator 9 as described above. In this case, a short circuit current from the capacitor 5 flows first because an impedance of the current path thereof is small (see the pulse-like waveform of Idc in the enlarged view of the FIG. 2 around the time point A).

However, the capacitor 5 has a small capacitance, and hence the discharge finishes in a short period of time before a large current to be protected flows, whereby Vbe drops to substantially 0 V. After that, a difference voltage between the battery voltage and Vbe is applied to the wire inductance 8, whereby that the short circuit current from the battery 7 increases and becomes very large short circuit current in the steady state.

Here, there are two points to be noted as follows. First, if a common phase arm short circuit failure occurs, Vbe drops instantaneously to substantially 0 V. Second, the short circuit current flows from the battery after that in delay due to an influence of an impedance of the wire inductance 8.

On the other hand, in the normal operation, Vbe does not drop substantially as described above. Therefore, if the voltage detection circuit 4 sets the threshold value of Vbe for generating a fail signal to be a value lower than the minimum voltage value to which Vbe can drop in the normal operation and if the voltage detection circuit 4 monitors Vbe, it is possible to detect a short circuit failure. In addition, the power conversion device 1 can be protected from a large current flowing from the battery due to the short circuit failure, by shutting off the power MOSFETs 6a to 6f promptly after the detection of the short circuit failure.

As described above, according to Embodiment 1, when the motor generator is driven, the power conversion is performed by the single pulse turn on control with a conducting angle of 180 degrees (i.e., 180 degree energizing control), and a voltage drop between DC terminals of the three-phase bridge type power conversion device is monitored by the voltage detection circuit, whereby a short circuit failure can be detected. As a result, a current sensor such as a shunt resistor for detecting excessive current becomes unnecessary, and downsizing of the power conversion device as well as low cost and high efficiency of the same can be achieved.

In addition, if the single pulse turn on control method is adopted instead of the pulse width modulation (PWM) control as the power conversion control for driving the motor generator, a large capacitance capacitor for smoothing the voltage between the DC terminals of the power conversion device can be eliminated. When the large capacitance capacitor is not used, the voltage between the DC terminals of the power conversion device drops instantaneously to substantially 0 V when a short circuit failure occurs, and after that the short circuit current flows from the DC power supply (battery). Therefore, if the short circuit failure is detected promptly from the voltage drop between the DC terminals so that the semiconductor switch is turned off at once, the semiconductor switch can be shut off before a large current due to the short circuit flows therein. As a result, it is possible to protect the semiconductor switch from a secondary breakdown due to a flow of the large current and shut off of the same, and hence the protection from the short circuit failure can be secured.

In addition, the voltage between the DC terminals of the power conversion device in the single pulse turn on control becomes lower when a short circuit failure occurs than in the normal operation, and the voltage drops more rapidly and largely as a capacitance of the capacitor between the DC terminals is smaller. Therefore, if the threshold value of the voltage between the voltage terminals for detecting a short circuit failure is set to be a value lower than the minimum voltage to which the voltage between the DC terminals can drop in the normal operation of the power conversion circuit, the short circuit failure can be detected. As a result, the normal state can be distinguished clearly from the state when a short circuit failure occurs. Thus, a short circuit failure can be detected easily by monitoring the voltage between the DC terminals, and an improper detection of a short circuit failure can be avoided.

Embodiment 2

Figure 3:
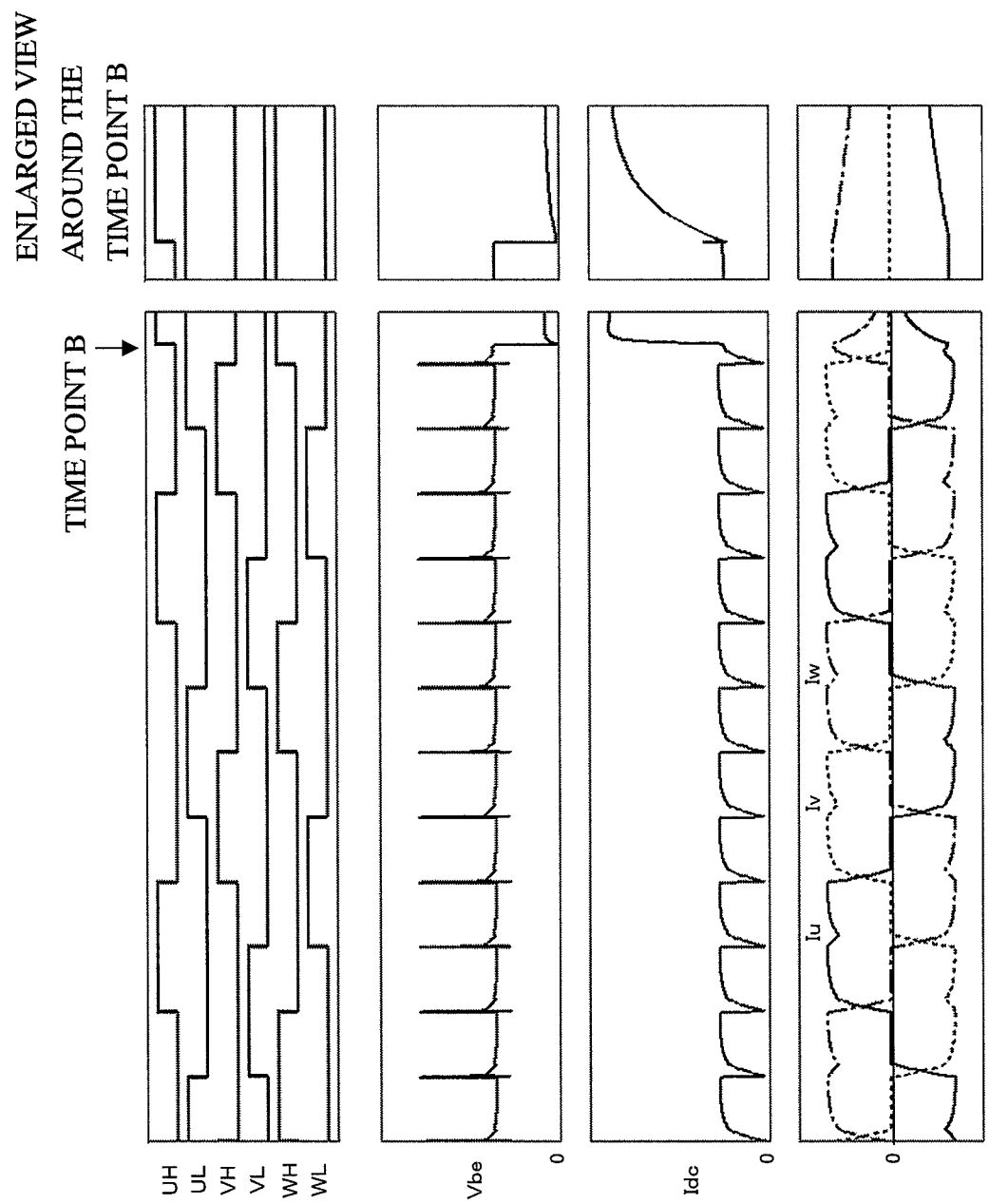
FIG. 3 is an explanatory diagram of operational waveforms of individual portions in 120 degree energizing control according to Embodiment 2 of the present invention.

Embodiment 1 describes the detection of a short circuit failure when the 180 degree energizing control is performed as the single pulse turn on method. In contrast, this Embodiment 2 describes the detection of a short circuit failure when 120 degree energizing control is performed as the single pulse turn on method. Specifically, in the above-mentioned structure illustrated in FIG. 1, operational waveforms of the individual portions are described, in which the single pulse turn on control with a conducting angle of 120 degrees is applied for driving the motor generator 9, including the case where a short circuit failure occurs. FIG. 3 is an explanatory diagram of operational waveforms of the individual portions in 120 degree energizing control according to Embodiment 2 of the present invention, and the individual waveform items are the same as those illustrated in FIG. 2.

In this way, the 120 degree energizing control changes the pattern of turning on the power MOSFETs every 60 degrees of the phase in synchronization with the rotation of the motor generator 9 in such an order as "(UH, VL)→(UH, WL)→(VH, WL)→(UL, VH)→(UL, WH)→(VL, WH)→(UH, VL)". Thus, AC voltages are applied between terminals of the stator windings of the motor generator 9 so that three-phase AC currents Iu, Iv, and Iw flow in the stator windings.

In other words, one of the power MOSFETs on the high potential side and the low potential side having one turned-on phase is always turned off so that entire DC current Idc supplied from the battery 7 is shut off. Therefore, a counter electromotive surge generated in the wire inductance 8 causes a voltage rise in the waveform of Vbe every 60 degrees of the phase. After that, the waveform of Vbe converges with oscillation by a resonance frequency of the wire inductance 8 and the capacitor 5. Therefore, the minimum value of Vbe is lower than the voltage in the steady state by an undershoot voltage of the oscillation.

On the other hand, when the power MOSFETs 6a to 6f are turned on, stator current of the phase is 0 A, and there is no rapid change in the current flowing in the wire inductance 8. Therefore, Vbe exhibits no conspicuous change. In this way, the switching of each of the power MOSFETs 6a to 6f does not cause a substantial drop of Vbe in the drive mode by the 120 degree energizing control even if the capacitor 5 has a small capacitance.

Next, it is supposed that the power MOSFET 6a of UH is improperly turned on so that the power MOSFETs 6a and 6b of the U phase are turned on simultaneously resulting in occurrence of a short circuit between the DC side terminals B and E of the power conversion device 1 at a time point B (see FIG. 3) in the drive operation of the motor generator 9 as described above. A phenomenon that occurs in this case is substantially similar to that of Embodiment 1. Therefore, the detection of a short circuit failure and the protection from the same can be performed similarly to those of Embodiment 1.

As described above, according to Embodiment 2, when the motor generator is driven, the power conversion is performed by the single pulse turn on control with a conducting angle of 120 degrees (i.e., 120 degree energizing control), and a voltage drop between DC terminals of the three-phase bridge type power conversion device is monitored by the voltage detection circuit, whereby a short circuit failure can be detected. As a result, similarly to Embodiment 1 in which the 180 degree energizing control is performed, a current sensor such as a shunt resistor for detecting excessive current becomes unnecessary, and downsizing of the power conversion device as well as low cost and high efficiency of the same can be achieved.

In addition, if the single pulse turn on control method is adopted instead of the pulse width modulation (PWM) control as the power conversion control for driving the motor generator, a large capacitance capacitor for smoothing the voltage between the DC terminals of the power conversion device can be eliminated. When the large capacitance capacitor is not used, the voltage between the DC terminals of the power conversion device drops instantaneously to substantially 0 V when a short circuit failure occurs, and after that the short circuit current flows from the DC power supply (battery). Therefore, if the short circuit failure is detected promptly from the voltage drop between the DC terminals so that the semiconductor switch is turned off at once, the semiconductor switch can be shut off before a large current due to the short circuit flows therein. As a result, it is possible to protect the semiconductor switch from a secondary breakdown due to a flow of the large current and shut off of the same, and hence the protection from the short circuit failure can be secured.

In addition, the voltage between the DC terminals of the power conversion device in the single pulse turn on control becomes lower when a short circuit failure occurs than in the normal operation, and the voltage drops more rapidly and largely as a capacitance of the capacitor between the DC terminals is smaller. Therefore, if the threshold value of the voltage between the voltage terminals for detecting a short circuit failure is set to be a value lower than the minimum voltage to which the voltage between the DC terminals can drop in the normal operation of the power conversion circuit, the short circuit failure can be detected. As a result, the normal state can be distinguished clearly from the state when a short circuit failure occurs. Thus, a short circuit failure can be detected easily by monitoring the voltage between the DC terminals, and an improper detection of a short circuit failure can be avoided.

Embodiment 3

Figure 4:
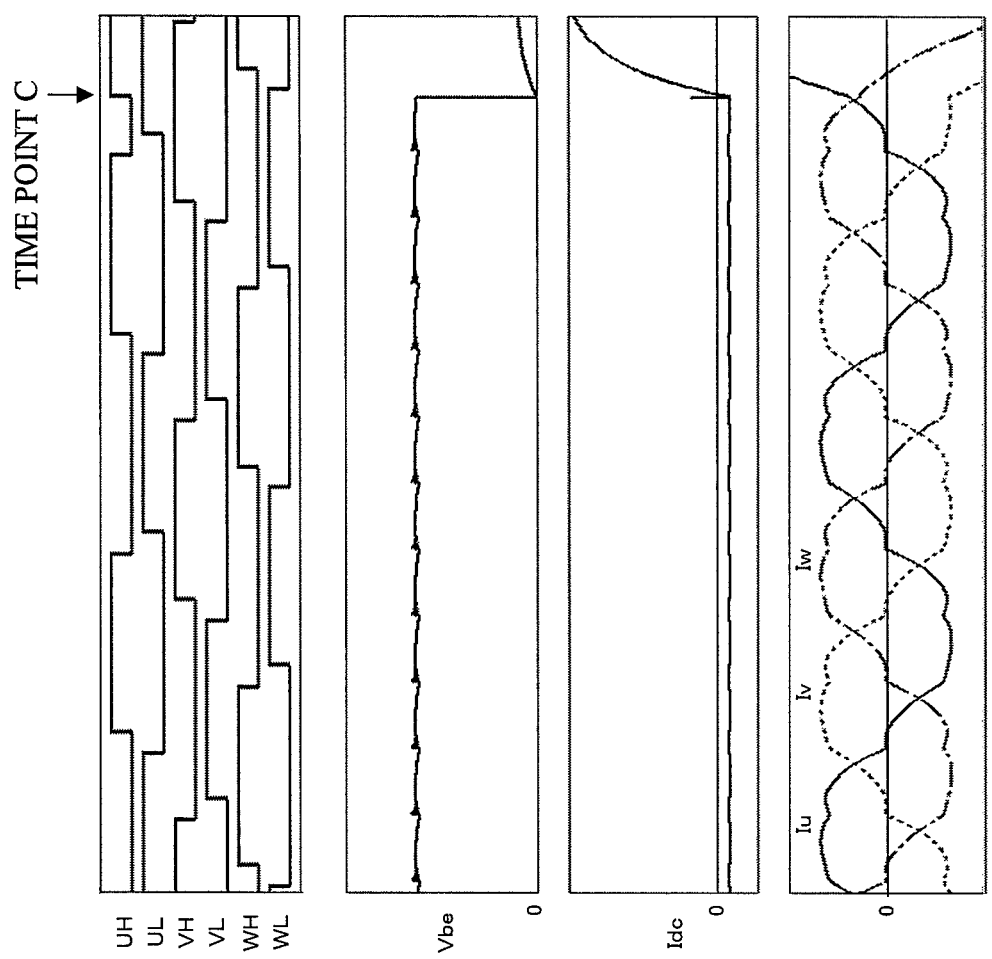
FIG. 4 is an explanatory diagram of operational waveforms of individual portions in synchronous rectification control according to Embodiment 3 of the present invention.

Embodiments 1 and 2 describe the detection of a short circuit failure when the 180 degree energizing control and the 120 degree energizing control are performed respectively as the single pulse turn on method. In contrast, this Embodiment 3 describes the detection of a short circuit failure when the synchronous rectification control is performed instead of the single pulse turn on method. Specifically, in the above-mentioned structure illustrated in FIG. 1, operational waveforms of the individual portions are described, in which the synchronous rectification control is performed in an electric power generation mode of the motor generator 9, including the case where a short circuit failure occurs. FIG. 4 is an explanatory diagram of operational waveforms of the individual portions in the synchronous rectification control according to Embodiment 3 of the present invention, and the individual waveform items are the same as those illustrated in FIG. 2.

In this way, when the three-phase AC currents Iu, Iv, and Iw generated by the motor generator 9 are rectified by a three-phase full-wave rectification and are converted into the DC current Idc by the three-phase bridge type power conversion circuit 2, the corresponding power MOSFET is turned on at the timing when the parasitic diode of each of the power MOSFETs 6a to 6f is energized in accordance with a polarity of current in each phase. Thus, the voltage drop due to the current flow becomes smaller, whereby the full-wave rectification can be performed efficiently while suppressing a loss in the power conversion circuit 2. This type of electric power generation control is referred to as synchronous rectification.

In this case, when each of the power MOSFETs 6a to 6f is turned on or off, the switching is performed in the phase where current is flowing in the direction from the source terminal to the drain terminal of each of the power MOSFETs 6a to 6f in both case. Therefore, the switching does not cause a rapid change in current flowing in the wire inductance 8, and hence Vbe becomes a stable voltage.

In this way, the switching of each of the power MOSFETs 6a to 6f hardly changes Vbe in the electric power generation mode by the synchronous rectification control even if the capacitor 5 has a small capacitance.

Next, it is supposed that the power MOSFET 6a of UH is improperly turned on so that the power MOSFETs 6a and 6b of the U phase are turned on simultaneously resulting in occurrence of a short circuit between the DC side terminals B and E of the power conversion device 1 at a time point C (see FIG. 4) in the electric power generating operation of the motor generator 9 as described above. A phenomenon that occurs in this case is substantially similar to that of Embodiment 1. Therefore, the detection of a short circuit failure and the protection from the same can be performed similarly to those of Embodiment 1.

As described above, according to Embodiment 3, when the motor generator generates electric power, the power conversion is performed by the synchronous rectification control, and a voltage drop between the DC terminals of the three-phase bridge type power conversion device is monitored by the voltage detection circuit, whereby a short circuit failure can be detected. As a result, similarly to Embodiments 1 and 2, a current sensor such as a shunt resistor for detecting excessive current becomes unnecessary, and downsizing of the power conversion device as well as low cost and high efficiency of the same can be achieved.

In addition, if the synchronous rectification control method is adopted as the power conversion control for the motor generator to generate electric power, a large capacitance capacitor for smoothing the voltage between the DC terminals of the power conversion device can be eliminated. When the large capacitance capacitor is not used, the voltage between the DC terminals of the power conversion device drops instantaneously to substantially 0 V when a short circuit failure occurs, and after that the short circuit current flows from the DC power supply (battery). Therefore, if the short circuit failure is detected promptly from the voltage drop between the DC terminals so that the semiconductor switch is turned off at once, the semiconductor switch can be shut off before a large current due to the short circuit flows therein. As a result, it is possible to protect the semiconductor switch from a secondary breakdown due to a flow of the large current and shut off of the same, and hence the protection from the short circuit failure can be securely performed.

In addition, the voltage between the DC terminals of the power conversion device in the synchronous rectification control becomes lower when a short circuit failure occurs than in the normal operation, and the voltage drops more rapidly and largely as a capacitance of the capacitor between the DC terminals is smaller. Therefore, if the threshold value of the voltage between the voltage terminals for detecting a short circuit failure is set to be a value lower than the minimum voltage to which the voltage between the DC terminals can drop in the normal operation of the power conversion circuit, the short circuit failure can be detected. As a result, the normal state can be distinguished clearly from the state when a short circuit failure occurs. Thus, a short circuit failure can be detected easily by monitoring the voltage between the DC terminals, and an improper detection of a short circuit failure can be avoided.

Further, the case where the power MOSFET 6a of UH is improperly turned on is exemplified in all of Embodiments 1 to 3 of the present invention, but this should not be interpreted to be a limitation. The detection of a failure and the protection from the same can be performed by the same principle also in the case where any one of the power MOSFETs 6a to 6f is improperly turned on or is broken down as a short circuit failure, or the case of a short circuit to the high voltage side DC terminal B line, a short circuit to the low voltage side DC terminal E line, a short circuit between AC terminal lines or other failures of the AC terminal U, V or W line of the power conversion device 1 due to a mechanical contact therebetween.

In addition, the battery 7 may be a large capacitance capacitor such as an electric double layer capacitor.

What is claimed is:

1. A power conversion device comprising:
   a three-phase bridge type power conversion circuit including a semiconductor switch including a first main terminal, a second main terminal, and a control terminal;
   a voltage detection circuit which has terminals connected to DC terminals of the power conversion circuit and is configured to monitor a voltage between the DC terminals of the power conversion circuit; and
   a control circuit configured to:
      control the semiconductor switch by a single pulse turn on control method, when the power conversion circuit converts DC power into AC power, so that a large capacitance capacitor for smoothing the voltage between the DC terminals is eliminated and a capacitor having only a substantially small capacitance value is connected in parallel to the voltage detection circuit and a battery providing the DC power, to reduce high frequency noise due to switching of the semiconductor switch and to suppress radiation noise, and
      determine that a short circuit failure has occurred and perform a protection function of turning off the semiconductor switch before a large current due to the short circuit flows therein, if the voltage between the DC terminals of the power conversion circuit, which is detected by the voltage detection circuit, is lower than a predetermined value and continues to be lower than the predetermined value for a predetermined period of time or longer,
   wherein the predetermined value is set to be a voltage lower than a minimum voltage that the power conversion circuit can reach in a normal operation, and
   the voltage detection circuit does not comprise a shunt resistor for detecting excessive current.

2. A power conversion device according to claim 1, wherein the control circuit performs a single pulse turn on control with a conducting angle of 180 degrees or a conducting angle of 120 degrees as the single pulse turn on control method.

3. The power conversion device according to claim 1, wherein the DC terminals of the power conversion circuit are connected to the battery and AC terminals of the power conversion circuit are connected to a generator which provides AC power.

4. A power conversion device comprising:
   a three-phase bridge type power conversion circuit including a semiconductor switch including a first main terminal, a second main terminal, and a control terminal;
   a voltage detection circuit which has terminals connected to DC terminals of the power conversion circuit and is configured to monitor a voltage between DC terminals of the power conversion circuit; and
   a control circuit configured to:
      control the semiconductor switch by a synchronous rectification control method, by turning on the semiconductor switch within a phase interval in which each semiconductor switch is turned on by a three-phase full-wave rectification in the power conversion circuit when the power conversion circuit converts an AC power into a DC power, so that a large capacitance capacitor for smoothing the voltage between the DC terminals is eliminated and a capacitor having only a substantially small capacitance value is connected in parallel to the voltage detection circuit and a battery providing the DC power, to reduce high frequency noise due to switching of the semiconductor switch and to suppress radiation noise, and
      determine that a short circuit failure has occurred and perform a protection function of turning off the semiconductor switch before a large current due to the short circuit flows therein, if the voltage between the DC terminals of the power conversion circuit, which is detected by the voltage detection circuit, is lower than a predetermined value and continues to be lower than the predetermined value for a predetermined period of time or longer;
   wherein the predetermined value is set to be a voltage lower than a minimum voltage that the power conversion circuit can reach in a normal operation, and
   the voltage detection circuit does not comprise a shunt resistor for detecting excessive current.

5. The power conversion device according to claim 4, wherein the DC terminals of the power conversion circuit are connected to the battery and AC terminals of the power conversion circuit are connected to a generator which provides AC power.

* * * * *